(12) United States Patent
Furco et al.

(10) Patent No.: US 11,056,861 B2
(45) Date of Patent: Jul. 6, 2021

(54) CONDUCTOR FOR A POWER DISTRIBUTION SYSTEM

(71) Applicant: Eaton Intelligent Power Limited, Dublin (IE)

(72) Inventors: Joel Furco, Baldwinsville, NY (US); Joseph M. Manahan, Manlius, NY (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 16/712,636

(22) Filed: Dec. 12, 2019

(65) Prior Publication Data

US 2020/0194977 A1   Jun. 18, 2020

Related U.S. Application Data

(60) Provisional application No. 62/779,908, filed on Dec. 14, 2018.

(51) Int. Cl.
| | | |
|---|---|---|
| *H02B 1/20* | (2006.01) | |
| *H01B 7/04* | (2006.01) | |
| *H02B 1/46* | (2006.01) | |

(52) U.S. Cl.
CPC ............... *H02B 1/20* (2013.01); *H01B 7/04* (2013.01); *H02B 1/46* (2013.01)

(58) Field of Classification Search
CPC ... H02B 1/20; H02B 1/46; H02B 1/56; H01B 7/04
See application file for complete search history.

(56) References Cited

U.S. PATENT DOCUMENTS

| | | | | |
|---|---|---|---|---|
| 2,738,445 | A * | 3/1956 | Hammerly | H02B 1/056 361/650 |
| 5,272,592 | A * | 12/1993 | Harris | H02B 1/20 361/637 |
| 7,338,331 | B2 * | 3/2008 | Yoon | H01R 9/2475 439/709 |
| 7,660,102 | B2 * | 2/2010 | Brutsch | H02B 1/056 361/648 |
| 8,235,732 | B2 | 8/2012 | Garascia et al. | |
| 8,547,684 | B2 * | 10/2013 | Diaz | H02B 1/20 361/637 |
| 8,625,256 | B2 * | 1/2014 | Schmid | H02B 1/20 361/624 |
| 8,711,547 | B2 * | 4/2014 | Marzano | H01H 71/082 361/624 |
| 8,859,897 | B2 * | 10/2014 | Hadi | H02G 5/005 174/68.2 |
| 9,033,721 | B2 | 5/2015 | Graf et al. | |
| 9,685,715 | B2 | 6/2017 | Yamauchi et al. | |

* cited by examiner

*Primary Examiner* — Mukundbhai G Patel
(74) *Attorney, Agent, or Firm* — Stinson LLP

(57) ABSTRACT

An electrical conductor for use in a power distribution assembly includes a main conductor portion including electrically conductive material. The main conductor portion extends along an axis. A plurality of flexible branch members include electrically conductive material. The flexible branch members extend laterally from the main conductor portion. Each flexible branch member is selectively bendable and configured for electrical connection to an electrical switching apparatus.

20 Claims, 15 Drawing Sheets

CONDUCTOR FOR A POWER DISTRIBUTION SYSTEM

CROSS-REFERENCE TO RELATED APPLICATION

This application claims priority to U.S. Provisional Patent Application Ser. No. 62/779,908, filed Dec. 14, 2018, which is hereby incorporated by reference in its entirety.

FIELD

The present disclosure generally relates to a power distribution system, and more particularly to a flexible conductor chassis for a power distribution system.

BACKGROUND

Electrical apparatus, such as electrical switching apparatus or electrical meters used in power distribution systems, are often mounted on or within an electrical enclosure (e.g., without limitation, a panel board; a load center; a meter breaker panel) either individually or in combination with other electrical meters or switchgear (e.g., without limitation, circuit switching devices and circuit interrupters such as circuit breakers, contactors, motor starters, motor controllers and other load controllers). The electrical enclosure is typically coupled to and supported by a structure such as, for example, a wall of a building, and includes a number of electrical bus members.

In industrial applications the available space is limited. Therefore, in order to maximize the space for process equipment and minimize the installation cost, it is beneficial to design power distribution equipment, such as panel boards, in the smallest possible footprint. Also, panel boards typically include at least one rigid bus bar acting as an electrical conductor for delivering electricity to the electrical switching apparatus. The rigid nature of the bus bar restricts the positioning of the switching apparatus within the panel board and the type of switching apparatus that can be used within the panel board. Typical rigid bus bars include multiple connection points which can be expensive to manufacture and increase assembly time. Further, joints between two attached conductors can increase electrical resistance creating thermal hot spots within the enclosure that may lead to increased frequency and cost of maintenance. For example, when a breaker is bolted directly to a bus bar there may be a relatively high resistance across that joint connection. This is shown in FIG. 1A where conductors 1A include elongate rigid bus bar sections 3A having rigid branch conductors 5A separately attached to the bus bar sections by fasteners 7A. This system has an increased electrical resistance thereby creating thermal resistance leading to increased temperature or hot spots further leading to increased frequency and cost of maintenance. Also, the joints may loosen as a result of temperature cycling increasing the resistance and temperature rise at the connection point. Loose connections may also lead to arcing which could be a source of ignition in a hazardous/combustible atmosphere. Panel boards can also have exposed live conductors which are a shock hazard to operators and maintenance workers.

An example of another rigid conductor assembly of the prior art is shown in FIG. 1B. Each conductor 1B includes an elongate rigid central bus bar portion 3B and a plurality of rigid branch sections 5B extending laterally from the central bus bar portion. The branch sections 5B are bent to accommodate stacking multiple conductor assemblies on top of each other for distributing multiple phases of electricity. This system, however, is only configured to accommodate one switchgear arrangement and limited types of switchgears. Thus, this bus bar arrangement requires a unique bus bar assembly for each breaker system layout required. Therefore, should the electrical system require a new breaker layout for any reason during the life of the system, complete replacement of the bus bar assembly is required increasing the cost and complicating the planning required for these maintenance events due to component availability. Further, these logistical challenges impact the availability to manufacture and inventory carrying costs of products yet to be configured for customer orders.

SUMMARY

In one aspect, an electrical conductor for use in a power distribution assembly generally comprises a main conductor portion comprising electrically conductive material. The main conductor portion extends along an axis. A plurality of flexible branch members comprise electrically conductive material. The flexible branch members extend laterally from the main conductor portion. Each flexible branch member is selectively bendable and configured for electrical connection to an electrical switching apparatus.

In another aspect, a power distribution assembly generally comprises an enclosure and a flexible electrical conductor disposed in the enclosure. The flexible electrical conductor comprises a main conductor portion comprising electrically conductive material. A plurality of branch members comprise electrically conductive material extending laterally from the main conductor portion. Each branch member is selectively bendable and configured for electrical connection to an electrical switching apparatus.

In yet another aspect, an electrical conductor assembly for use in a power distribution assembly generally comprises an electrical conductor. A casing covers at least a portion of the electrical conductor. The casing insulates at least a portion of the electrical conductor.

BRIEF DESCRIPTION OF THE DRAWINGS

Corresponding reference characters indicate corresponding parts throughout the drawings.

DETAILED DESCRIPTION

Figure 1A:
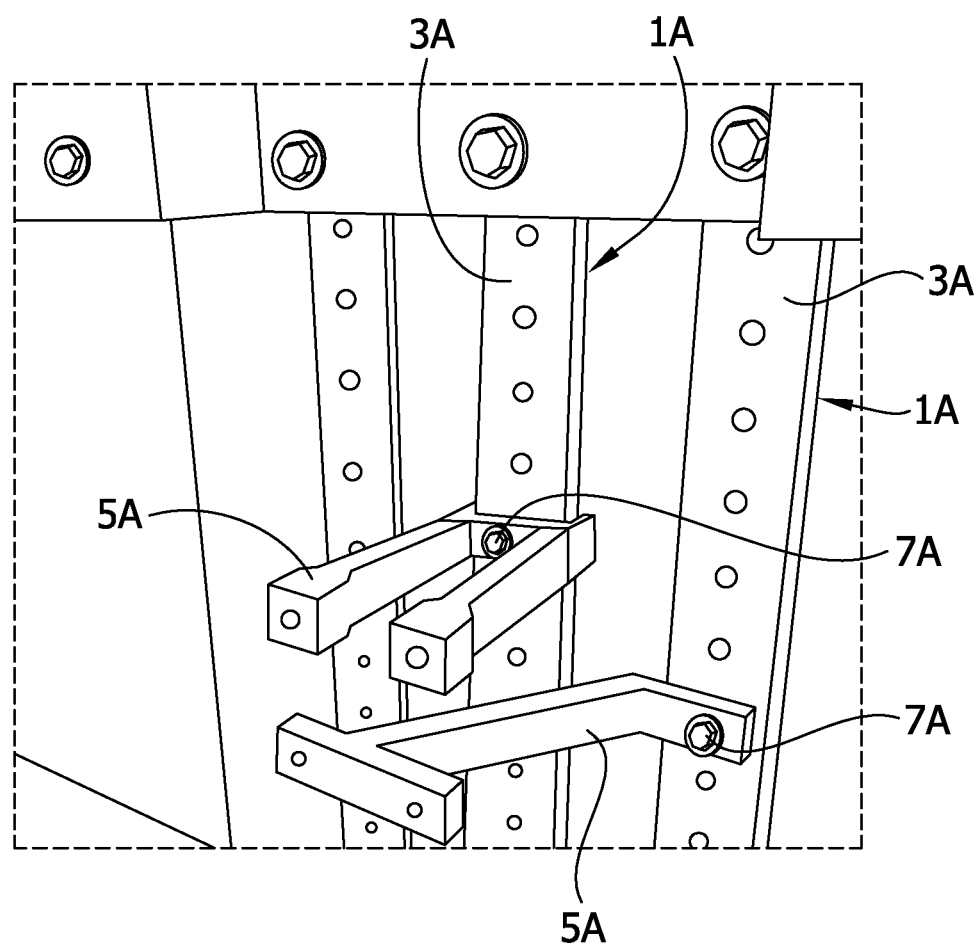
FIG. 1A is a perspective of a prior art conductor assembly.
Figure 1B:
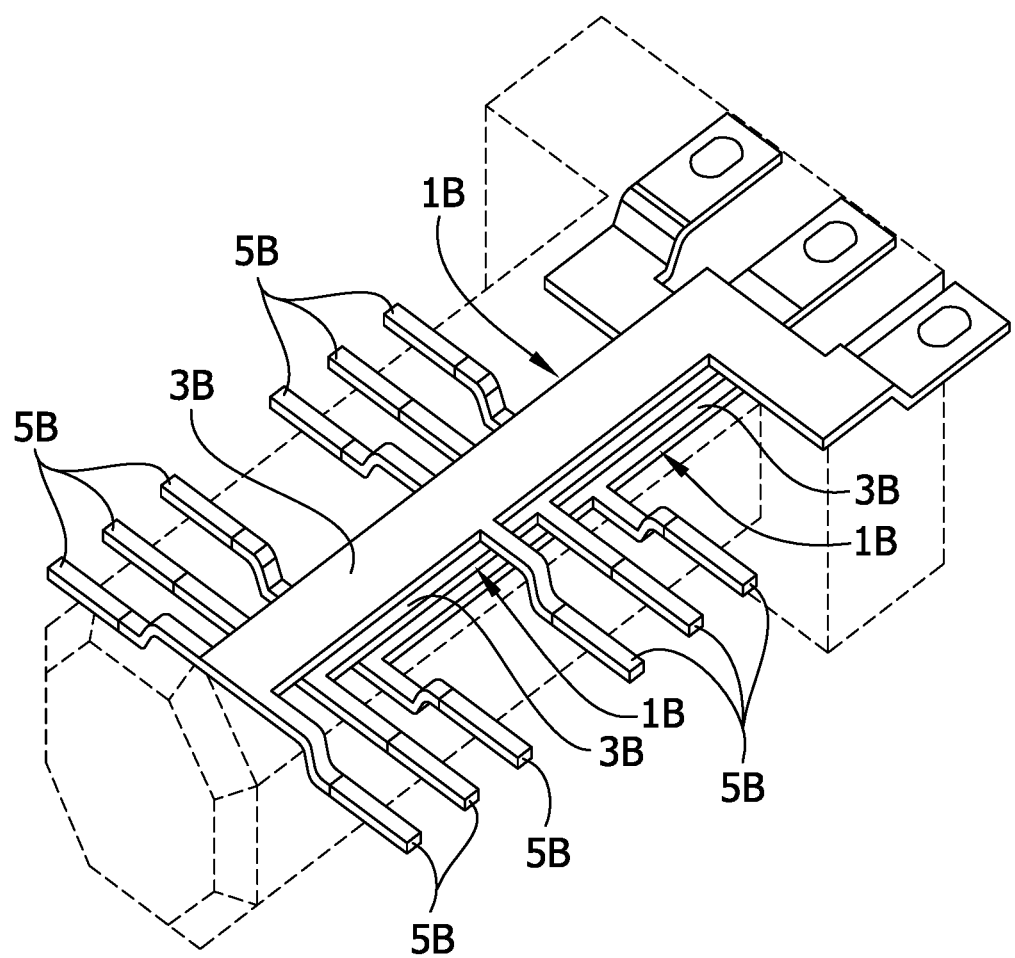
FIG. 1B is a perspective of another prior art conductor assembly.

Referring to FIGS. 2A-4, one embodiment of a power distribution assembly is generally indicated at 20. The power distribution assembly 20 includes an electrical enclosure generally indicated at 22. The enclosure 22 includes a housing 24 which can be made from any suitable material such as stainless steel, plastic, etc. The housing 24 can include a door or cover 25 or any other structure for providing access to the internal components of the enclosure 22. The housing 24 may also include an internal cover or "dead front" cover 27 within the interior of the housing. The "dead front" cover 27 has cutouts for receiving switching apparatuses 32. An electrical conductor 30 is housed within the enclosure 22. The conductor 30 is configured to electrically connect to multiple electrical switching apparatuses 32 such as, for example and without limitation, circuit breakers. While the switching apparatus 32 are described as circuit breakers, any known or suitable type and/or configuration of electrical switching apparatus could be employed, without departing from the scope of the present disclosure. To that extent, the conductor 30 enables the combination of different circuit breaker manufacturer's equipment having different structures within a single system. This combination of different circuit breakers would not be possible in a rigid bus bar system. For this reason, it is standard for panel board systems incorporating rigid bus bars to specify a single suitable switching apparatus manufacturer for use in the system. The conductor 30 alleviates the needs for such a restriction. In one embodiment, the electrical conductor 30 is an electrical bus which carries or transfers voltage, current, or power.

As employed herein, the term "enclosure" refers to any suitable structure for housing an electrical switching apparatus (e.g., without limitation, circuit switching devices and circuit interrupters such as circuit breakers, contactors, motor starters, motor controllers and other load controllers) and expressly includes, without limitation, panel boards, load centers and switchgear cabinets, as well as other structures or compartments which are covered with a panel, such as, for example and without limitation, in a prepared opening in the wall of a building, in a piece of machinery, or in a vehicle.

As employed herein, the statement that two or more parts are "attached" together shall mean that the parts are joined together either directly or joined through one or more intermediate parts.

As employed herein the term "fastener" refers to any suitable connecting or tightening mechanism including, but not limited to, rivets, screws, bolts, and the combinations of bolts and nuts (e.g., without limitation, lock nuts) and bolts, washers and nuts.

Continuing reference to FIGS. 2A-C and 3, the electrical conductor 30 within the enclosure 22 comprises a flexible electrical conductor. The conductor 30 includes an elongate flexible central conductor portion (broadly, a main conductor portion) 34 and a plurality of elongate flexible branch members or conductors 36 extending laterally from the central conductor portion. Each branch member 36 is configured for electrically connecting to a switching apparatus 32. Therefore, the conductor 30 provides a flexible electrically conductive chassis for making multiple electrical connections to different switching apparatuses 32. The branch members 36 are selectively bendable such that the branch members can be bent in a first configuration to accommodate a first switching apparatus arrangement, and subsequently bent in a second or more configurations, different from the first configuration, to accommodate a second or more switching apparatus arrangements. Thus, the branch members 36 are elastically deformable. The central conductor portion 34 may also be elastically deformable. The conductor 30, including the central conductor portion 34 and the branch members 36, can be bent or folded about multiple axes and/or twisted about an axis to configure the conductor in a desired configuration for a particular use. The bending, folding, and or twisting can be done by hand by an end user. Thus, the conductor 30 can be configured as needed to accommodate switching apparatuses 32 of different sizes and shapes. Moreover, as will be explained in greater detail below, the flexible nature of the conductor 30 allows the switching apparatuses 32 to be properly positioned when multiple conductors are stacked on top of each other within the enclosure 22 for distributing multiple phases of electricity.

Figure 3:
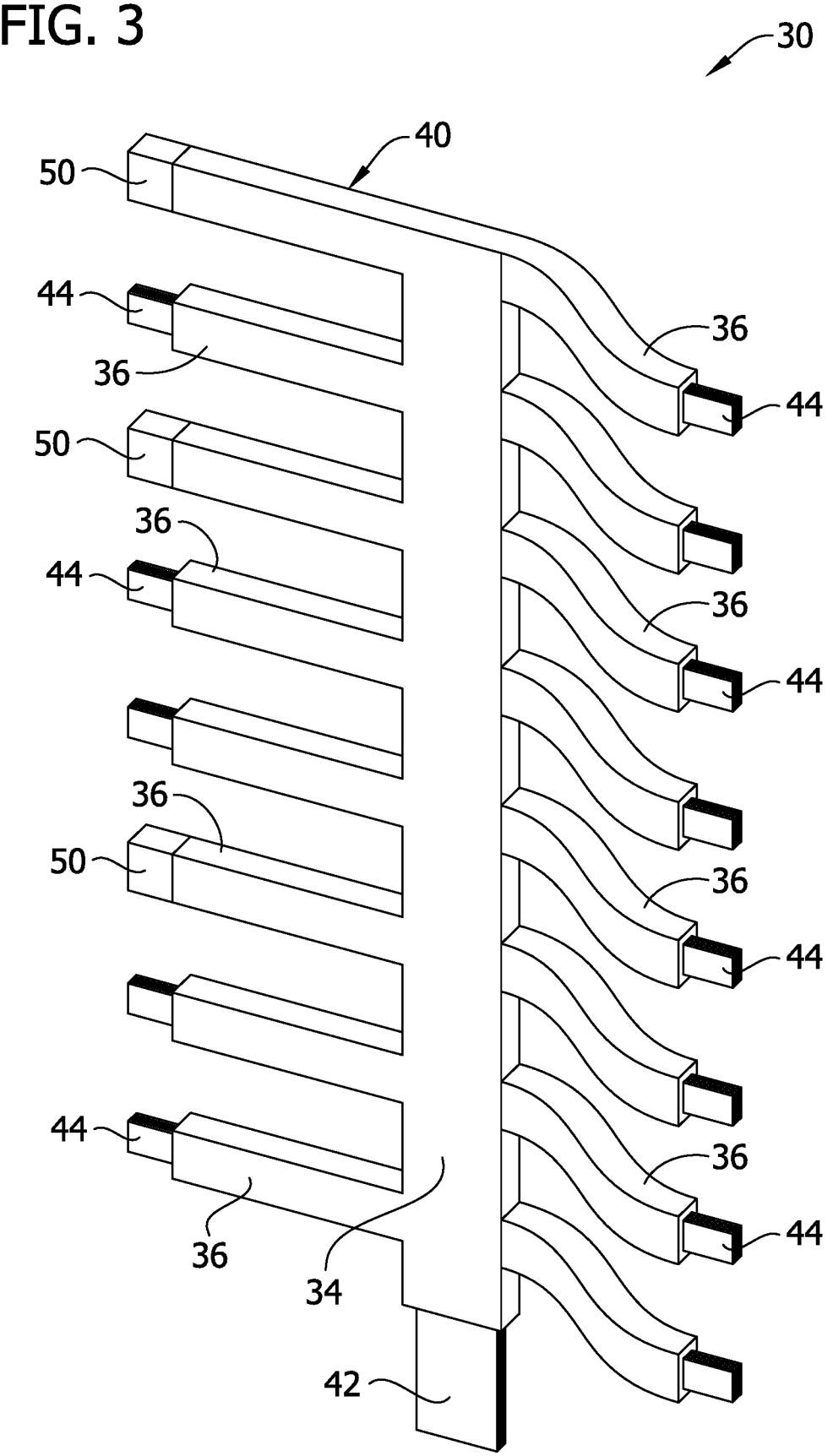
FIG. 3 is a perspective of a conductor showing portions of the conductor in a bent configuration and including caps over portions of the conductor.
Figure 4:
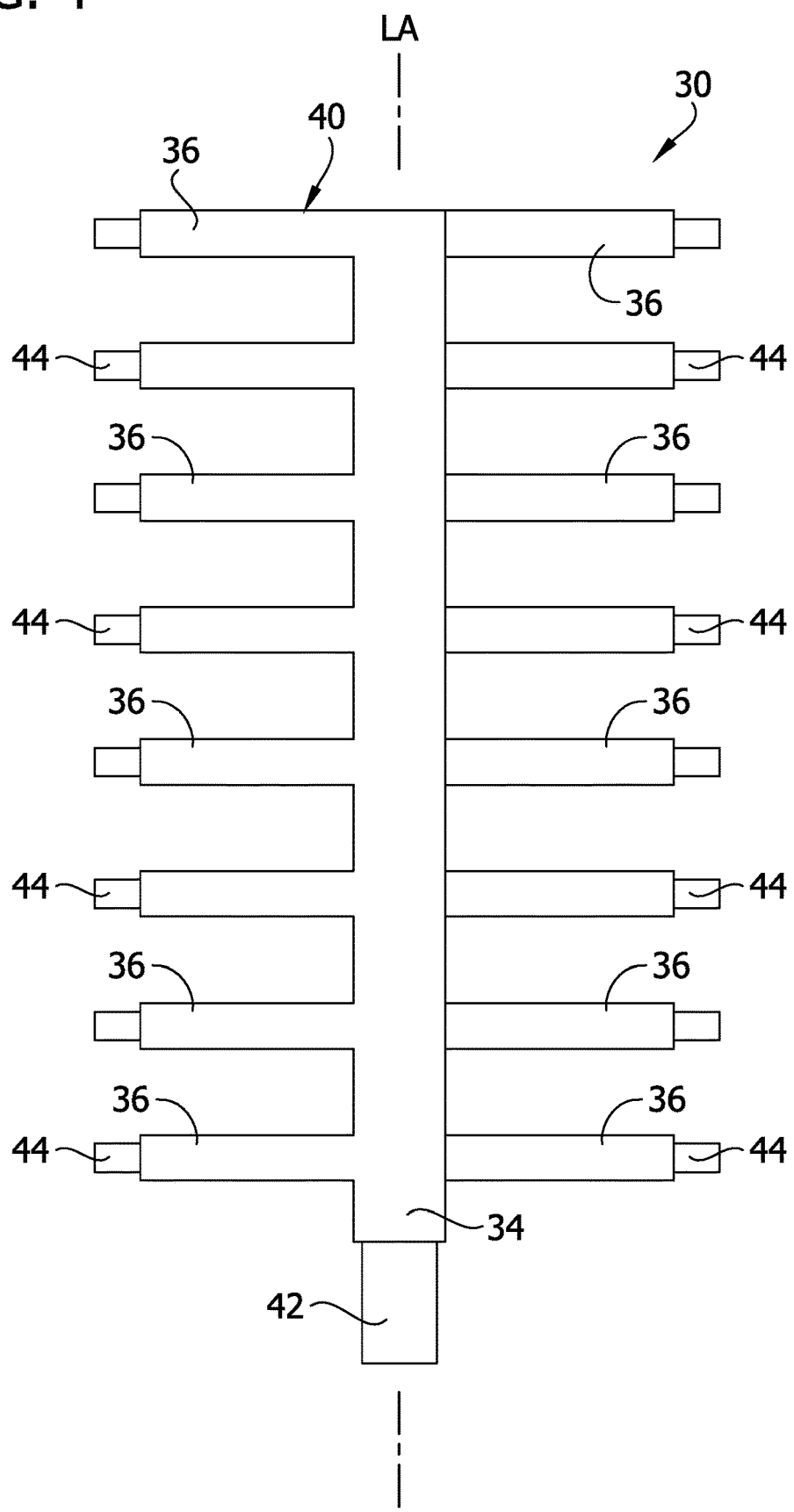
FIG. 4 is a front view of the conductor in FIG. 3 with all caps removed.

Referring to FIGS. 3 and 4, the flexible conductor portion 34 and each flexible branch member 36 individually comprise generally rectangular components. Other configurations of the conductor portion 34 and branch members 36 are also envisioned without departing from the scope of the disclosure. In one embodiment, the flexible branch members 36 are formed integrally with the flexible central conductor portion 34. However, the branch members 36 could be formed separately from the central conductor portion 34 and suitably attached to the central conductor portion. Additionally, in a non-limiting example, there are shown eight (8) branch members 36 extending perpendicularly outwardly from opposite sides of the central conductor portion 34 of the conductor 30 for a total of sixteen (16) branch members. It will be understood that other numbers of branch members 36 are also envisioned. Further, the central conductor portion 34 can be shortened or lengthened to accommodate the desired number of branch members 36. As illustrated, the branch members 36 on one side of the central conductor portion 34 are aligned along a longitudinal axis LA of the central conductor portion with a branch member on the opposite side of the central conductor portion. Alternatively, one or more branch members 36 could be staggered or off-set along the longitudinal axis LA of the central conductor portion 34 relative to the branch members on the opposite side of the central conductor portion.

The central conductor portion 34 and the branch members 36 of the conductor 30 may each comprise multiple layers of laminated conductive material such as copper, aluminum, or any other suitable electrically conductive material. The layers of conductive material may also be plated with the same or another electrically conductive material such as tin, silver, aluminum, or any other suitably conductive coatings. It will be understood that the central conductor portion 34 and branch members 36 can have other configurations without departing from the scope of the disclosure. An insulation cover or sleeve 40 surrounds at least a portion of the conductor 30 including the central conductor portion 34 and the branch members 36. In the illustrated embodiment, the cover 40 surrounds a substantial portion of the central conductor portion 34 and branch members 36 but does not completely surround the entire conductor 30. As shown, the cover 40 surrounds substantially the entire central conductor portion 34 except for a free end section 42 of the central conductor portion, and surrounds substantially an entirety of each of the branch members 36 except for free end sections 44 of the branch members. The exposed free end sections 42, 44 are configured for electrically connecting with the switching apparatuses 32. For example, a main circuit breaker may be electrically connected to the free end section 42 of the central conductor portion 34, and branch circuit breakers may be electrically connected to the free end sections 44 of the branch members 36. As shown in FIG. 2C, a flexible connector 46 may connect the free end section 42 of the central conductor portion 34 to the main circuit breaker 32.

Referring to FIG. 3, a cap 50 may cover the free end sections 44 of at least some of the branch members 36. For example, a cap 50 may be placed over the free end sections 44 of the branch members 36 that are not connected to a switching apparatus 32. Additionally, branch members 36 which are not connected to a switching apparatus 32 may be bent or otherwise moved out of the area of the other branch members to provide additional space within the enclosure for the switching apparatuses, and for further insulating the bare conductor end from a service person. As shown, in FIG. 2B, a bottom branch member 36 is rolled up shielding the end of the branch member. Referring back to FIG. 3, the caps 50 are formed from insulating material like the insulation cover 40 so that no electrically conductive portion of the conductor 30 is exposed. The cover 40 and caps 50 may be formed as an overmold or by extrusion. In one embodiment, the portion of the cover 40 surrounding the central conductor portion 34 of the conductor 30 is overmolded on the conductor, and the portion of the cover surrounding the branch members 36 is extruded. However, the entire cover 40 may be overmolded or extruded without departing from the scope of the disclosure. Suitable materials for forming the cover 40 and caps 50 include, without limitation, thermoplastics including polyvinyl chloride (PVC).

Alternatively, while the insulation material of the cover 40 is shown as covering a portion, but not all, of the electrically conductive material of the conductor 30, the insulation material of the cover 40 may extend over an entirety of the central conductor portion 34 and/or one or more branch members 36 eliminating the need for a separate cap to cover an exposed free end section 42, 44. In this instance, a section of the cover 40 may be removed from the central conductor portion 34 and/or one or more branch members 36 to expose the electrically conductive material for connection to a switching apparatus 32.

Figure 2A:
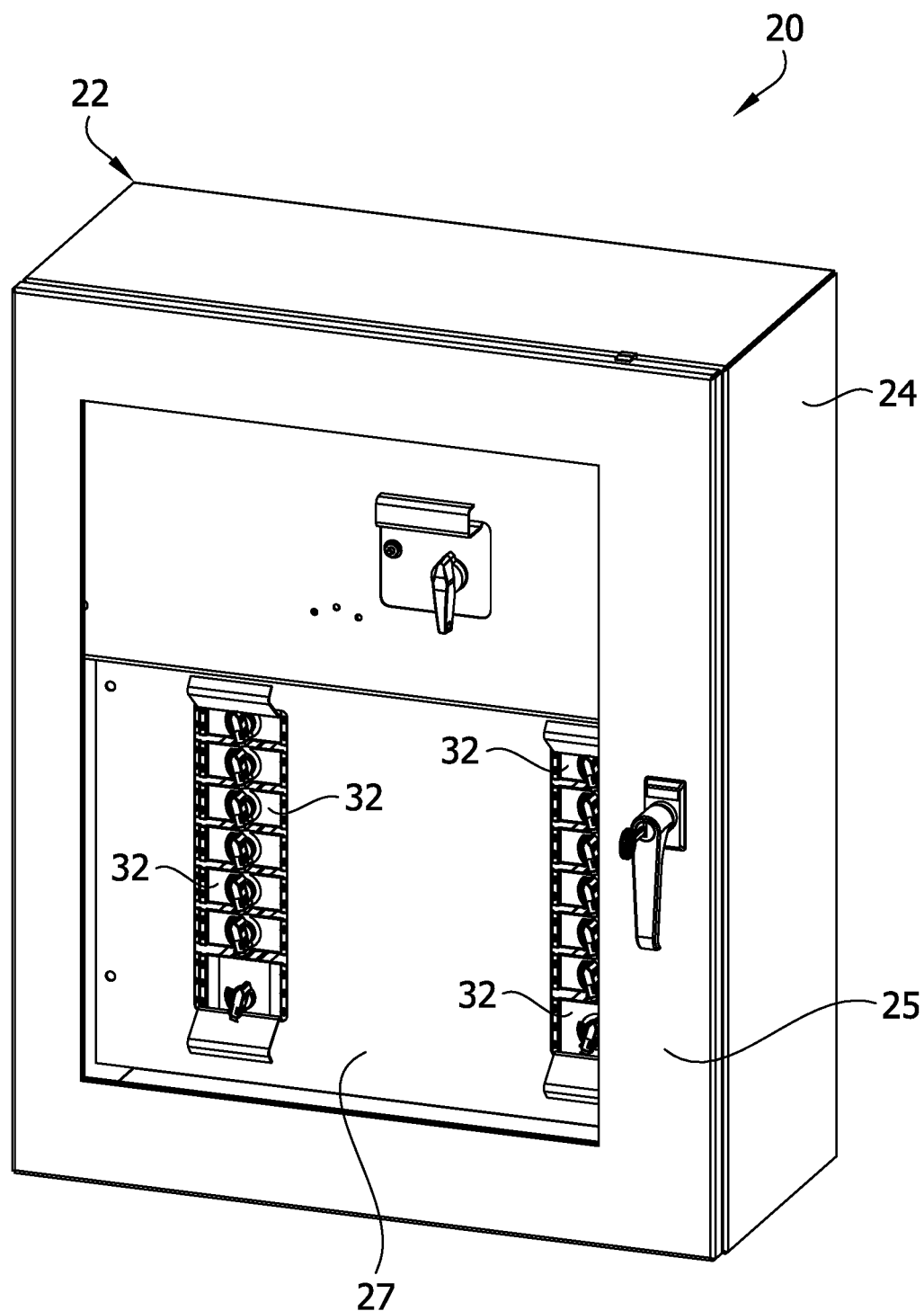
FIG. 2A is a perspective of a power distribution assembly including an enclosure.
Figure 2B:
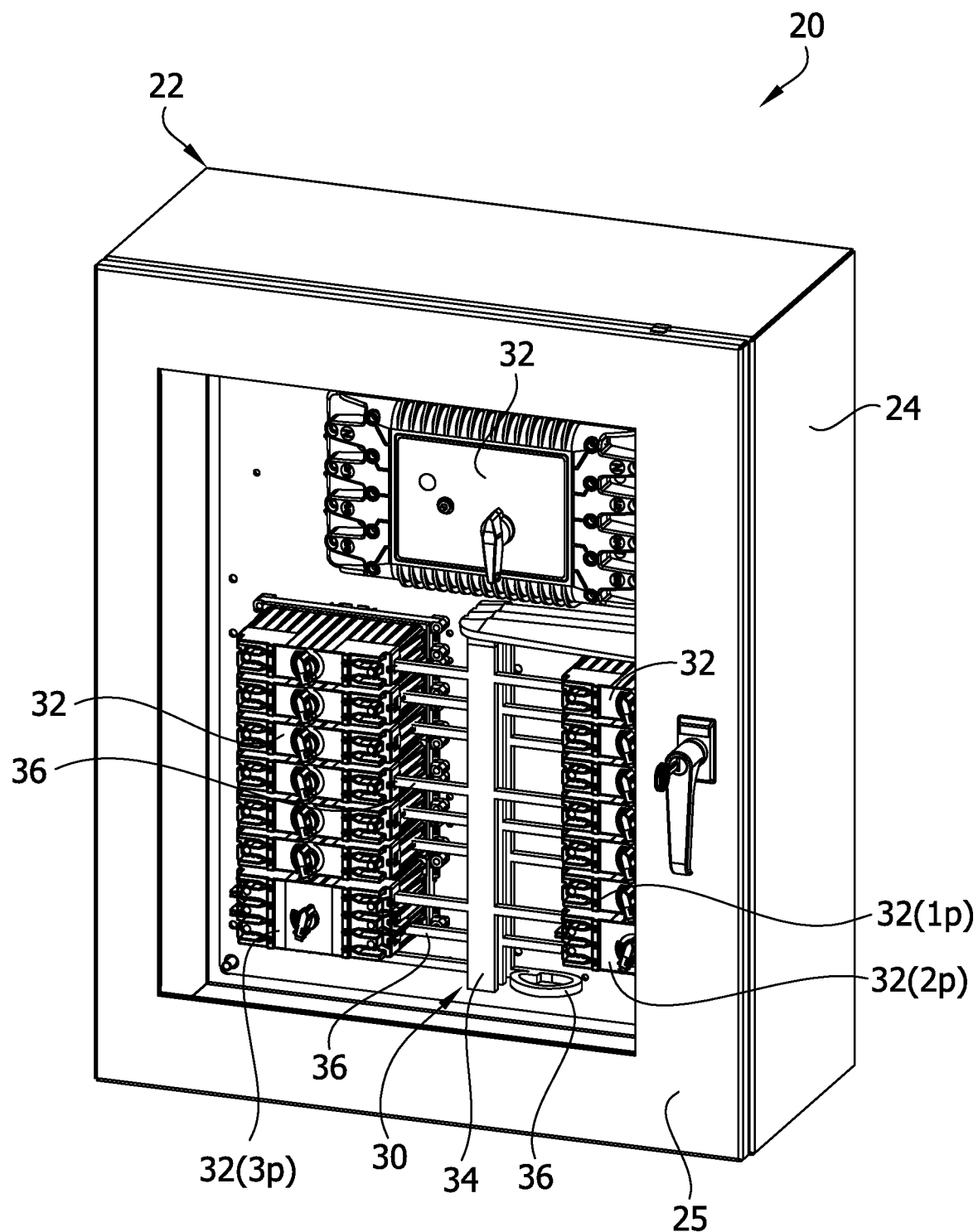
FIG. 2B is a perspective of the power distribution assembly in FIG. 2A with an internal cover removed showing conductors within the enclosure and connected to multiple switching apparatuses.
Figure 2C:
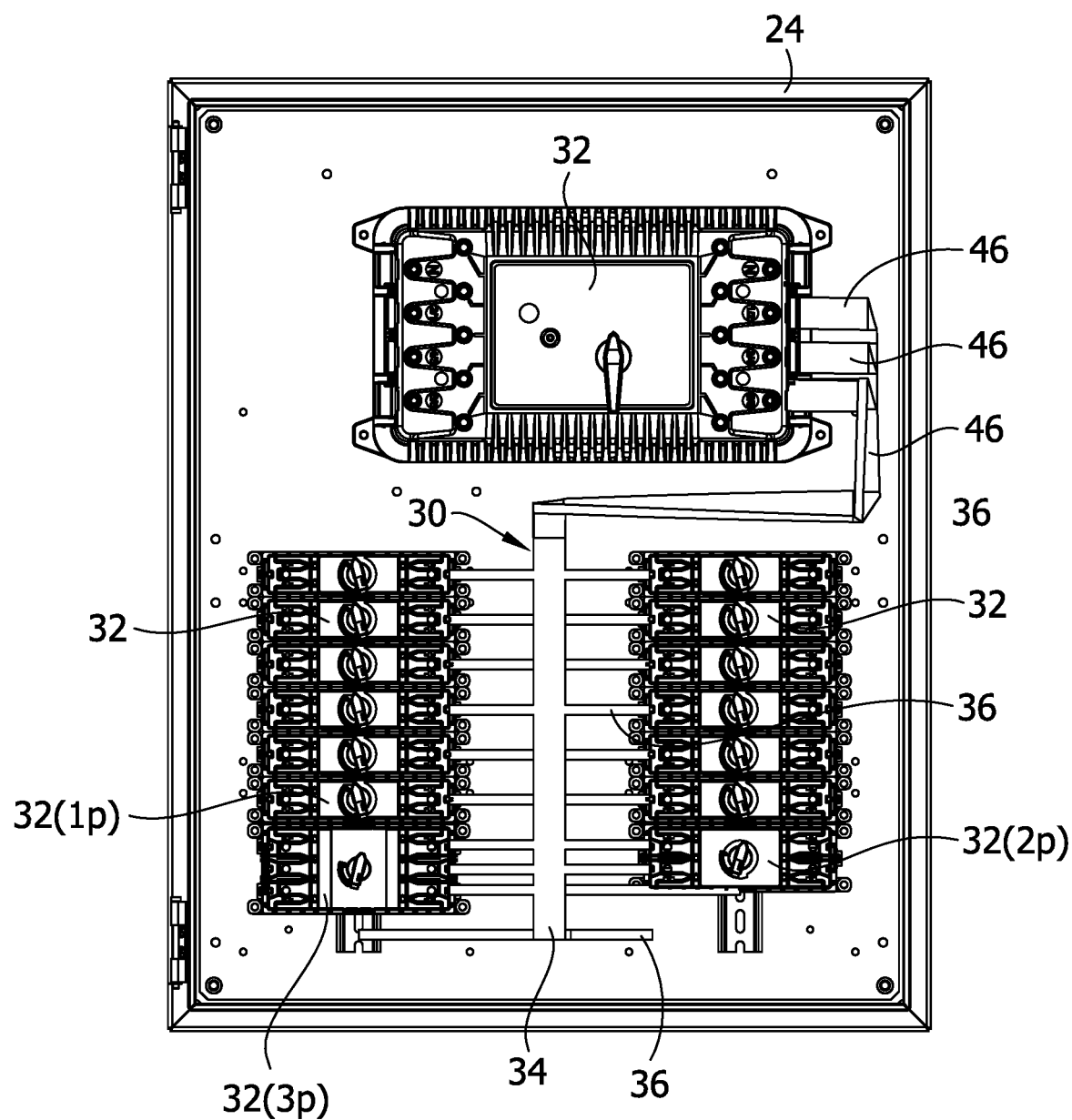
FIG. 2C is a front view of the power distribution assembly in FIG. 2B with a door of the enclosure removed.

As shown in FIGS. 2B and 2C, the flexible and insulated configuration of the conductor 30 also facilitates stacking two or more conductors on top of each other to configure the power distribution assembly for delivering multiple phases of electricity. In this arrangement, a first conductor 30 could be configured to distribute a first phase of electricity to a first set of switching apparatus 32 in the enclosure 22, a second conductor 30 placed directly over the first conductor or at least generally over the first conductor could be configured to distribute a second phase of electricity to a second set of switching apparatus 32 in the enclosure, a third conductor 30 placed directly over the second conductor or at least generally over the second conductor could be configured to distribute a third phase of electricity to a third set of switching apparatus 32 in the enclosure, and so on. With the conductors 30 stacked on top of each other, the branch members 36 may not align perfectly with a respective switching apparatus 32. This is particularly the case for multiple pole circuit breakers 32. FIGS. 2B and 2C identify a 2 pole circuit breakers $32_{(2p)}$ and a 3 pole circuit breaker $32_{(3p)}$. The flexible configuration of the conductor 30, and the branch members 36 in particular, allows for a sound electrical connection to still be made with the switching apparatus, including the multiple pole circuit breakers $32_{(2p)}$, $32_{(3p)}$, by bending, twisting, or otherwise manipulating the branch member to connect with the switching apparatus. The insulating cover 40 surrounding each of the conductors 30 insulates each conductor from any other conductor within the enclosure 22 allowing the conductors 30 to be placed directly on top of each other without having any interference between the phases.

Figure 5:
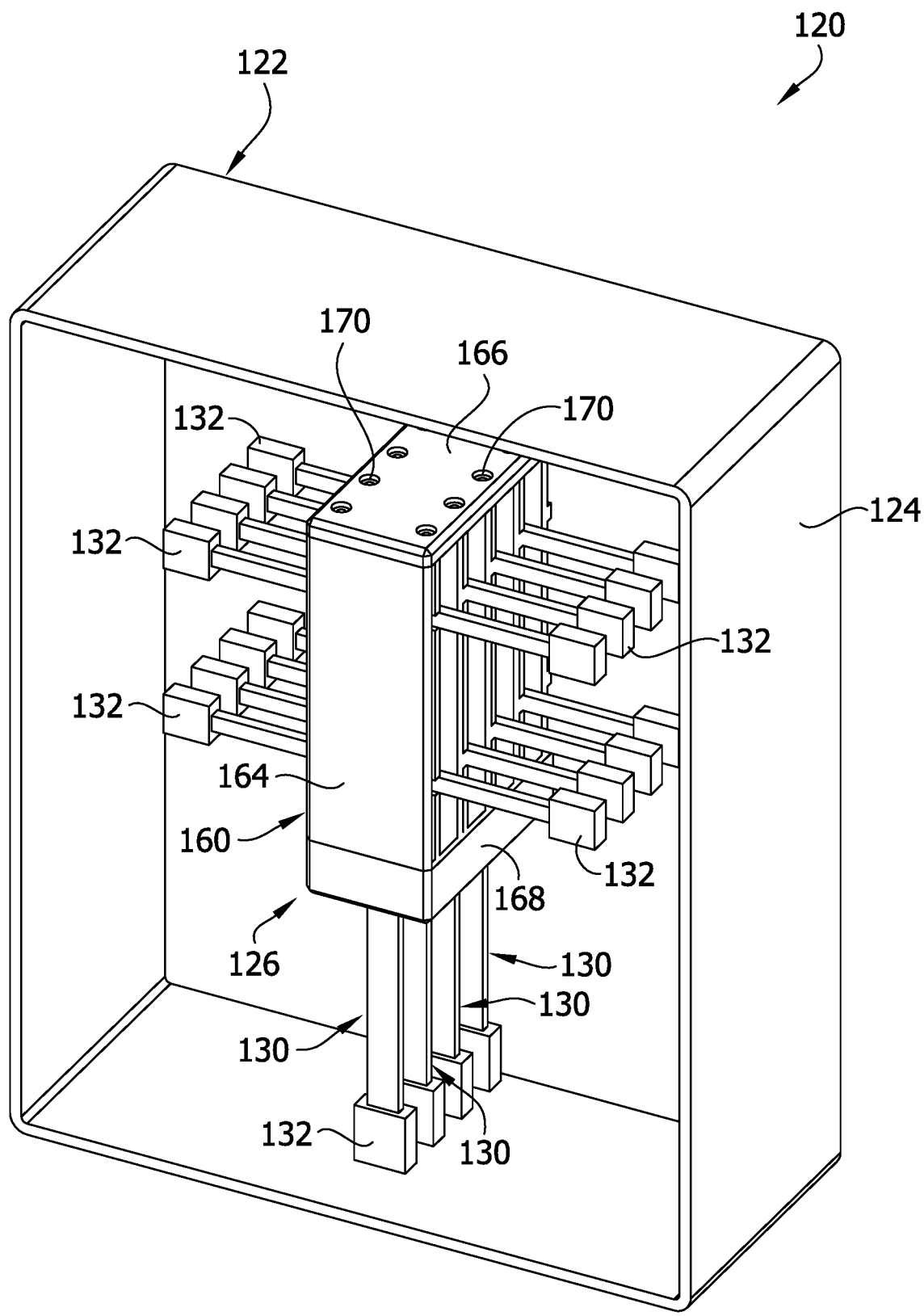
FIG. 5 is a perspective of a power distribution assembly of another embodiment including an enclosure and a conductor assembly within the enclosure and connected to multiple switching apparatuses.
Figure 6:
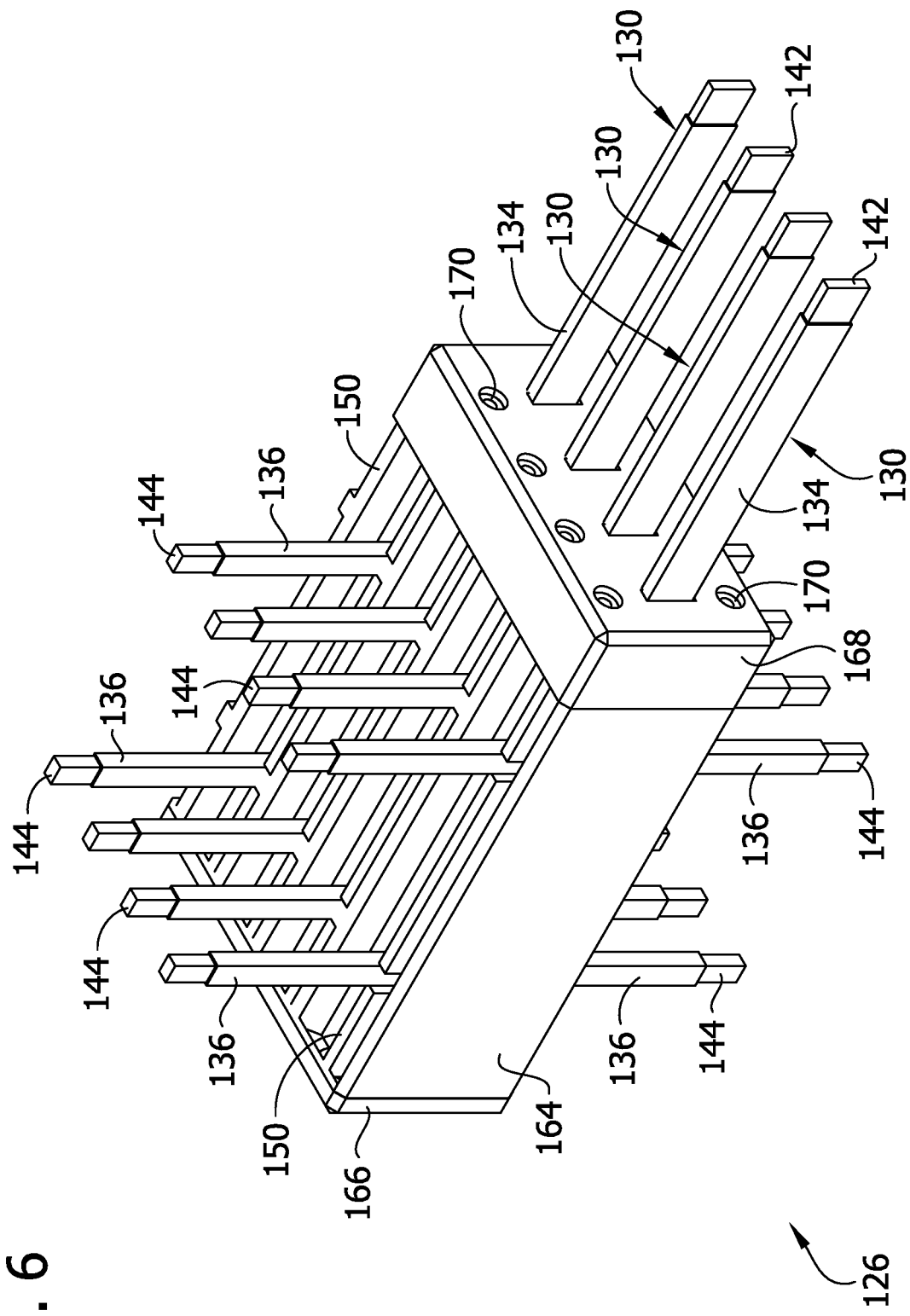
FIG. 6 is a perspective of the conductor assembly in FIG. 5.
Figure 7:
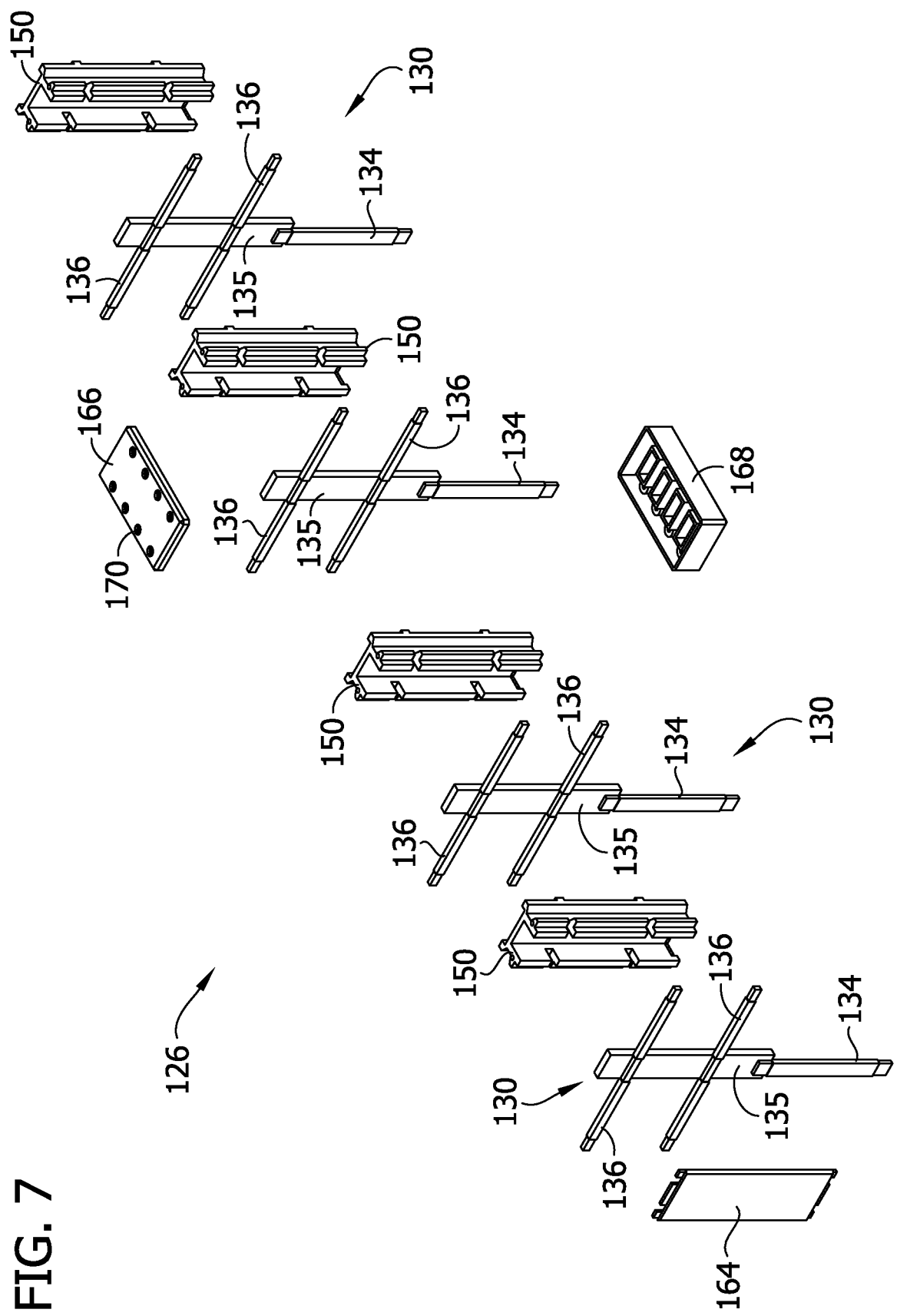
FIG. 7 is an exploded view of the conductor assembly in FIG. 6.

Referring to FIGS. 5-7, a power distribution assembly of another embodiment is generally indicated at 120. The power distribution assembly 120 includes an electrical enclosure generally indicated at 122. The enclosure 122 includes a housing 124 having a door or cover (not shown) or any other structure for providing access to the internal components of the enclosure 122. An electrical conductor assembly 126 is housed within the enclosure 122 and comprises a plurality of electrical conductors 130. The electrical conductors 130 are separated from each other by insulation members 150 to ensure that the proper electrical spacing is maintained within the assembly 126. The conductors 130 and insulation members 150 are held together by a casing 160 forming the conductor assembly 126. Each conductor 130 of the conductor assembly 126 is configured to electrically connect to multiple electrical switching apparatuses 132 such as, for example and without limitation, circuit breakers. In the illustrated embodiment, the multiple conductors 130 facilitate distributing multiple phases of electricity.

Figure 8:
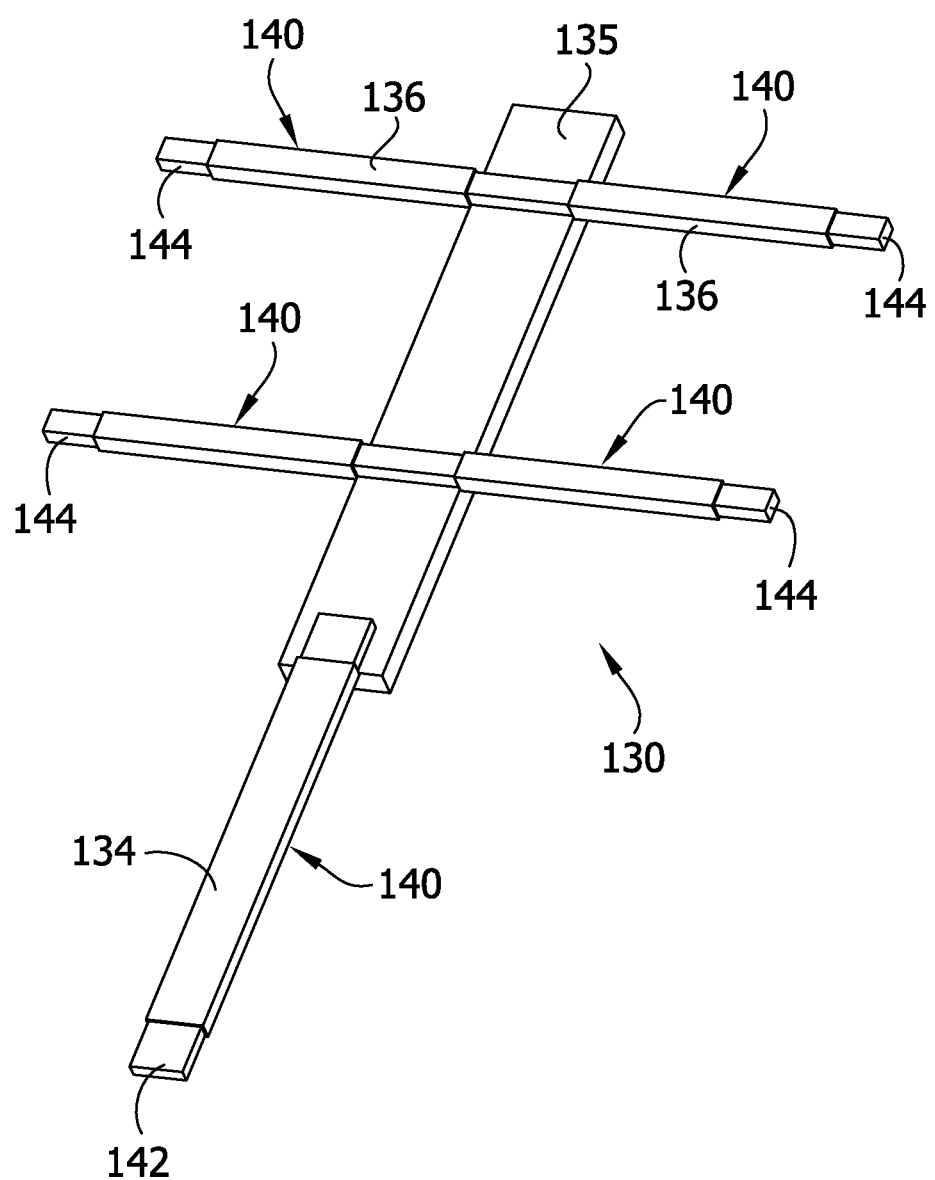
FIG. 8 is a perspective of a conductor of the conductor assembly in FIG. 6.
Figure 9:
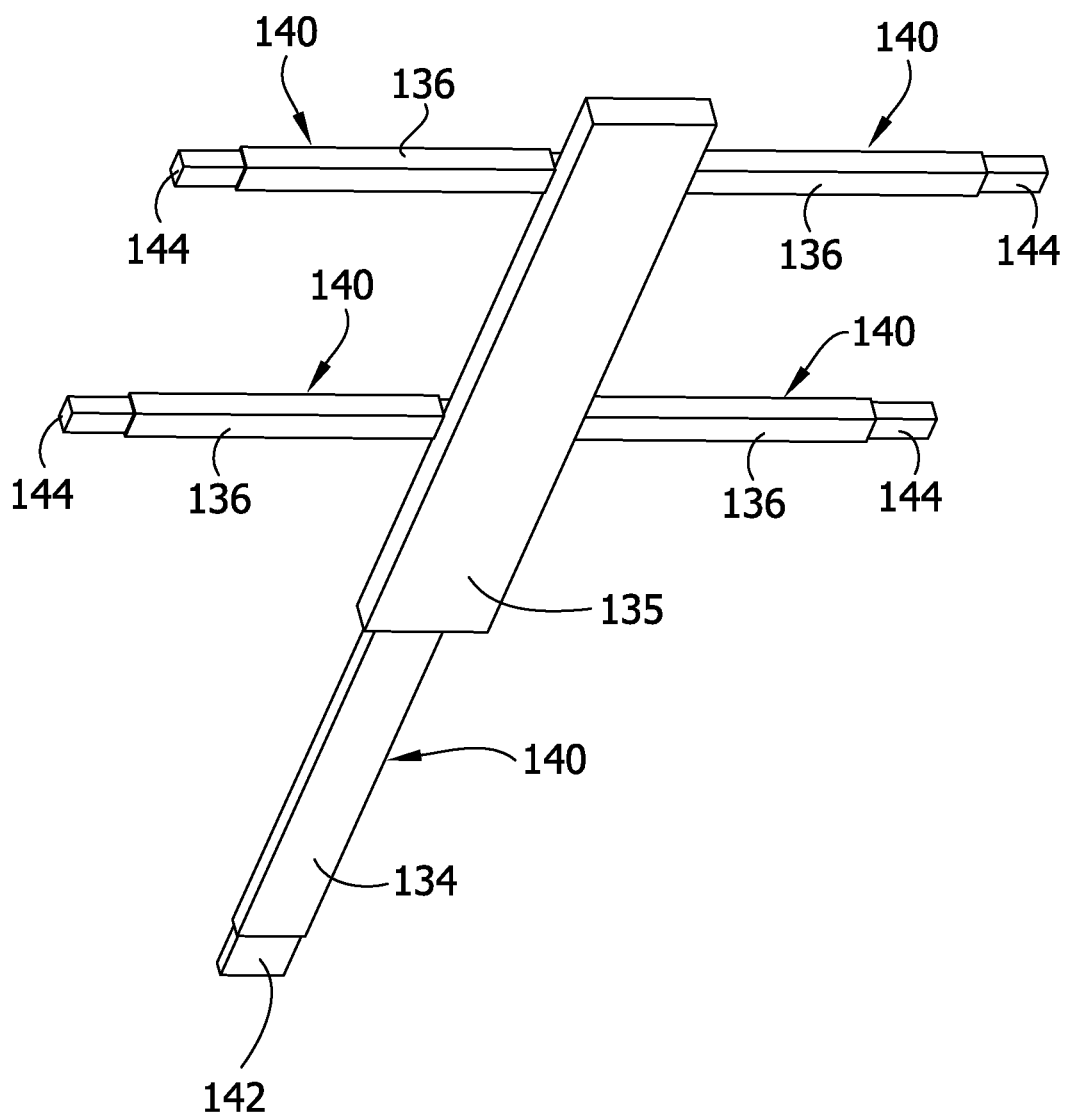
FIG. 9 is another perspective of the conductor in FIG. 8.
Figure 10:
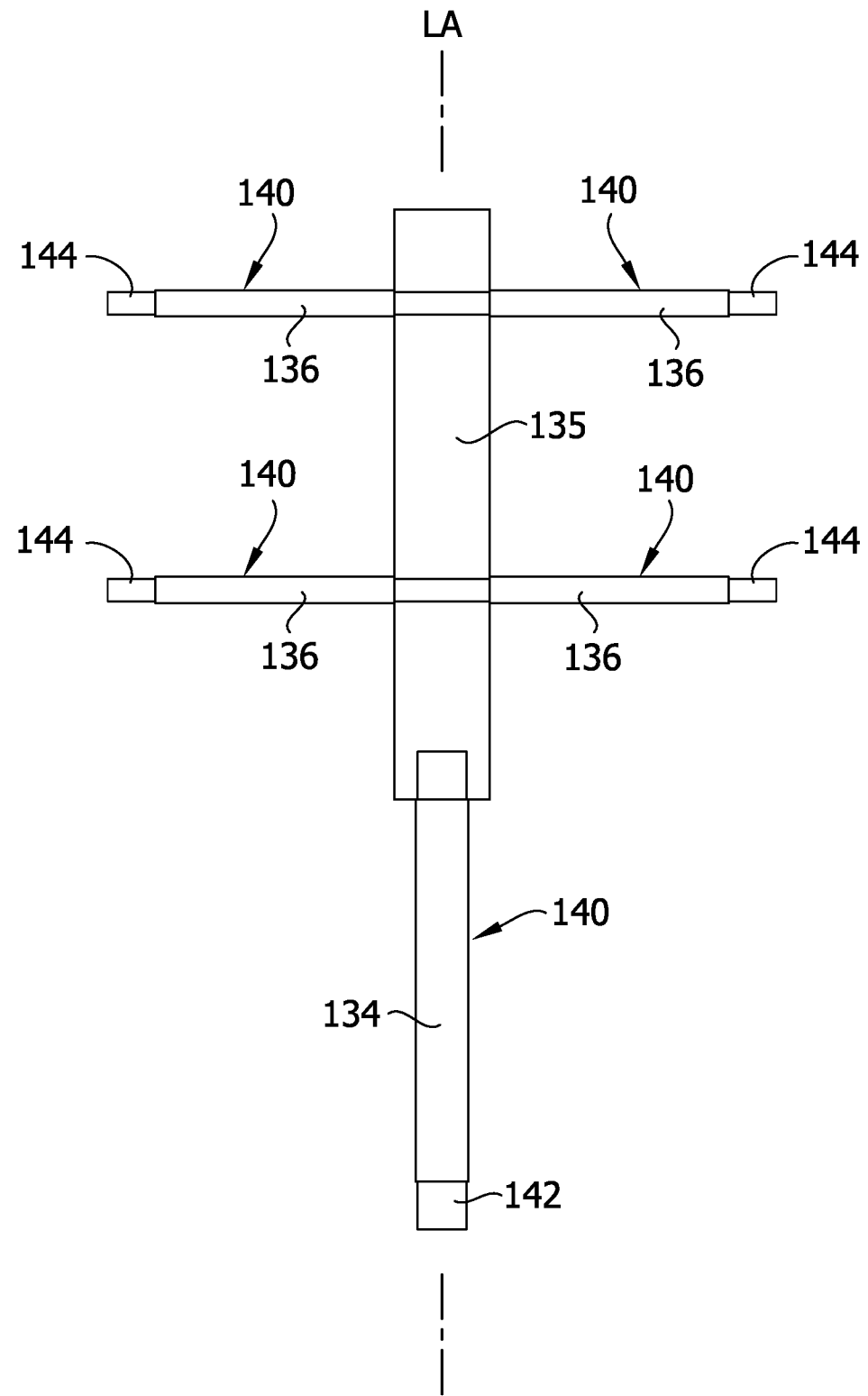
FIG. 10 is a front view of the conductor in FIG. 8.

Referring to FIGS. 8-10, each electrical conductor 130 of the conductor assembly 126 comprises at least a partially flexible electrical conductor. Each conductor 130 includes an elongate rigid central conductor portion 135, an elongate flexible central conductor portion 134 attached to the rigid central conductor portion such that the conductor portions extend along a common longitudinal axis LA of the conductor, and a plurality of elongate flexible branch members 136 attached to the rigid central conductor portion 135 and extending laterally outward from the rigid central conductor portion. The branch members 136 may be attached to the rigid conductor portion 135 by any suitable means. For example, threaded fasteners, rivets, welding, adhesive, clamps, or any other suitable attachment mechanism may be used to attach the branch members 136 to the rigid conductor portion 135. Each branch member 136 is configured for electrically connecting to a switching apparatus 132. Therefore, each conductor 130 provides a flexible electrically conductive chassis for making multiple electrical connections to different switching apparatuses 132. The elongate rigid central conductor portion 135 and the elongate flexible central conductor portion 134 may be broadly considered a main conductor portion. Alternatively, just the rigid central conductor portion 135 may be considered a main conductor portion.

The rigid central conductor portion 135, flexible central conductor portion 134, and each flexible branch member 136 individually comprise generally rectangular components. Other configurations of the conductor portions 134, 135 and branch members 136 are also envisioned without departing from the scope of the disclosure. In the illustrated embodiment, there are shown two (2) branch members 136 extending perpendicularly outwardly from opposite sides of the rigid central conductor portion 135. It will be understood that other numbers of branch members 136 are also envisioned. Also, while each branch member 136 is shown as extending laterally from both sides of the rigid conductor portion 135, one or more branch members could be separated into two separate branch members and suitably attached to opposite sides of the rigid conductor portion. In this embodiment, one or more branch members could be staggered or off-set along a longitudinal axis of the rigid central conductor portion 135 relative to the branch members on the opposite side of the rigid central conductor portion.

The rigid central conductor portion 135 may comprise a standard copper bus bar member, and the flexible central conductor portion 134 and the branch members 136 may each comprise multiple layers of laminated conductive material such as copper, aluminum, or any other suitable electrically conductive material. The layers of conductive material may also be plated with the same or another electrically conductive material such as tin, silver, aluminum, or any other suitably conductive coatings. It will be understood that the central conductor portions 134, 135 and branch members 136 can have over configurations without departing from the scope of the disclosure. Insulation covers or sleeves 140 surround the flexible central conductor portions 134 and the flexible branch members 136 of the conductors 130. In the illustrated embodiment, the covers 140 surround a substantial portion of the flexible central conductor portion 134 and branch members 136 but do not surround their entireties. As shown, the covers 140 surround substantially an entirety of the flexible central conductor portion 134 but does not cover a free end section 142 of the flexible central conductor portion. Similarly, the covers 140 surround substantially an entirety of the branch members 136 but do not cover free end sections 144 of the branch members. The exposed free end sections 142, 144 are configured for electrically connecting with the switching apparatuses 132. For example, a main circuit breaker may be electrically connected to the free end section 142 of the flexible central conductor portion 134, and branch circuit breakers may be electrically connected to the free end sections 144 of the branch members 136.

Figure 11:
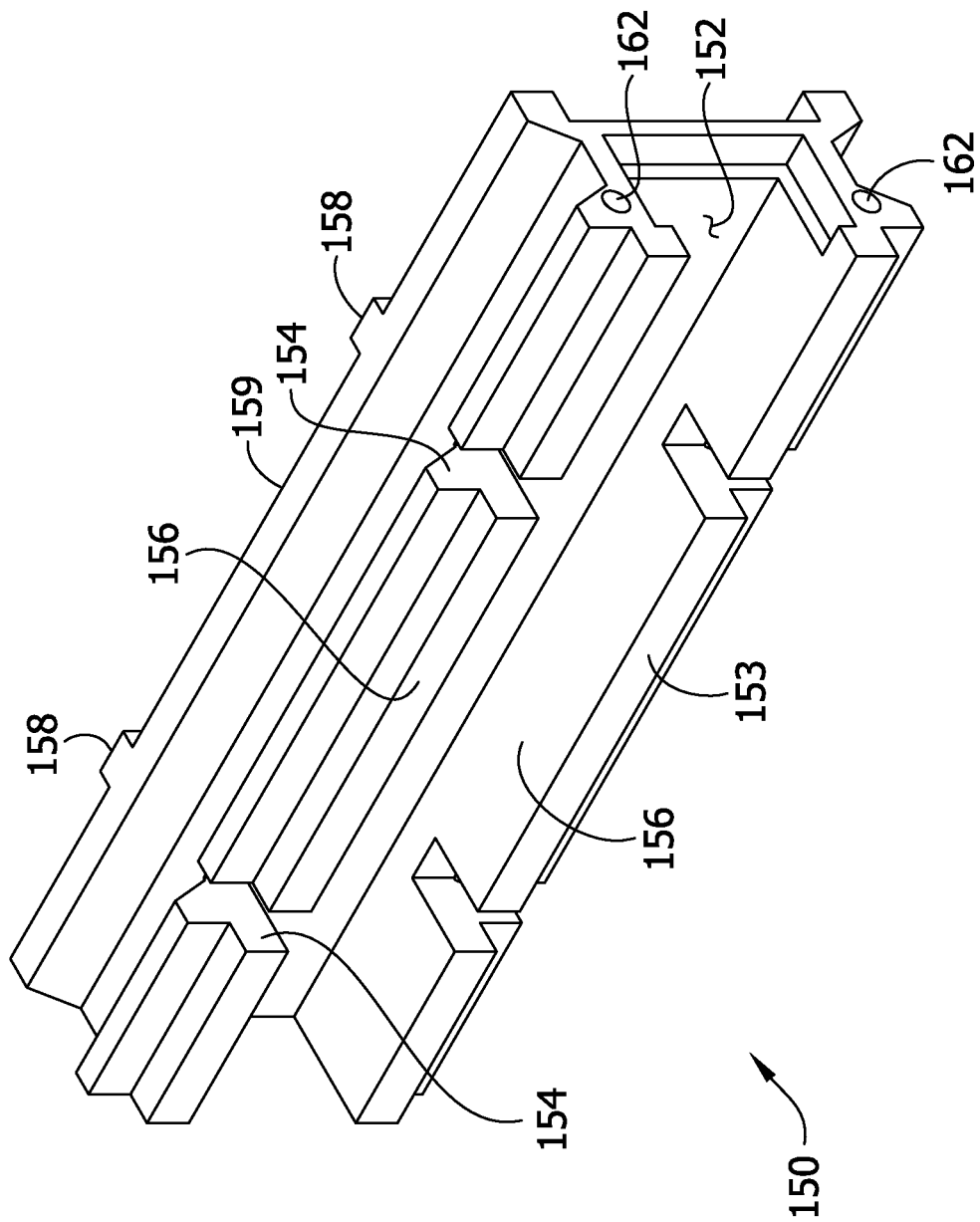
FIG. 11 is a perspective of an insulation member of the conductor assembly.
Figure 12:
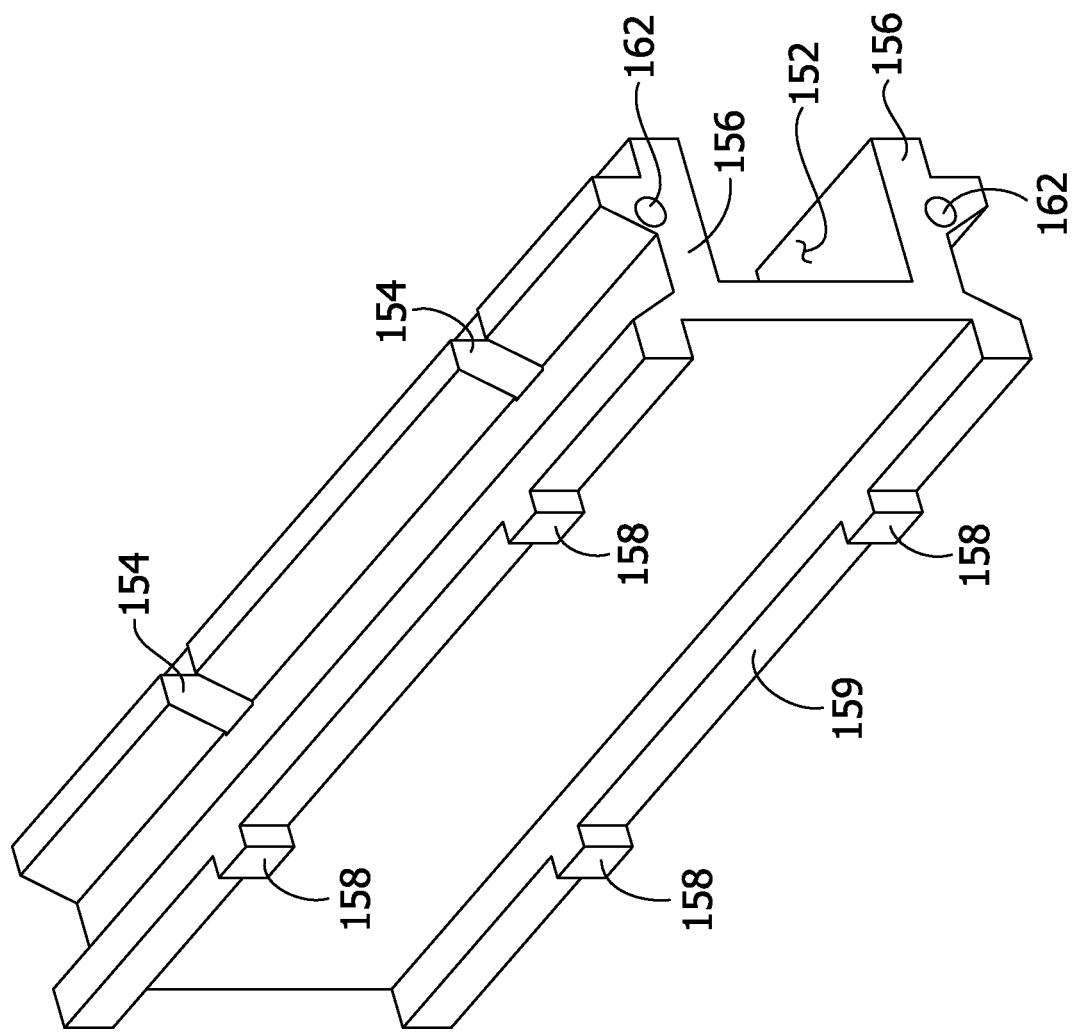
FIG. 12 is another perspective of the insulation member of the conductor assembly.

Referring to FIGS. 6, 11, and 12, each insulation member 150 receives one of the conductors 130 and spaces the conductor from the other conductors so that there is no electrical interference between the conductors in the conductor assembly 126. Each insulation member 150 includes a central channel 152 in a first side 153 of the block for receiving at least some of the central conductor portions 134, 135, and cutouts 154 in side walls 156 of the central channel 152 for receiving the branch members 136 to locate a conductor 130 at least partially in the insulation member. Protrusions 158 on an opposite second side 159 of the insulation member 150 are configured to be received in the cutouts 154 in an adjacent insulation member 150 to help secure a conductor 130 received in the adjacent insulation member within the adjacent insulation member. Additionally, the second sides 159 of the insulation members 150 have a generally mating configuration with the first sides 153 of the insulation members so that the insulation members can be nested with each other to provide a compact arrangement for the conductor assembly 126. Longitudinal ends of the insulation members 150 include fastener holes 162 for connecting portions of the casing 160 to the insulation members to hold the insulation members and conductors 130 together. The insulation members 150 could be fastened together any number of ways including by snap fit. In one embodiment, the insulation members 150 are formed from molded plastic.

Referring to FIGS. 6 and 7, the casing 160 comprises a front panel 164, a top panel 166, and bottom panel 168. Fasteners (not shown) extend through fastener holes 170 in the top and bottom panels 166, 168 and through the fastener holes 162 in the insulation members 150 to secure the top and bottom panels 166, 168 to the insulation members 150 and place the top and bottom panels in frictional engagement with the front panel 164 to hold the panels together around the insulation members. Other suitable configurations of the casing 160 and other means for coupling the conductors 130 and insulation members 150 together may also be incorporated without departing from the scope of the disclosure. For example, the casing 160 could comprise multiple snap fit components.

The multiple conductors 130 separated by the insulation members 150 configures the power distribution assembly 120 for delivering multiple phases of electricity. Thus, a first conductor 130 may be configured to distribute a first phase of electricity to a first set of switching apparatuses 132 in the enclosure 122, a second conductor 130 may be configured to distribute a second phase of electricity to a second set of switching apparatuses 132 in the enclosure, a third conductor 130 may be configured to distribute a third phase of electricity to a third set of switching apparatuses 132 in the enclosure, and a fourth conductor 130 may be configured to distribute a fourth phase of electricity to a fourth set of switching apparatuses 132 in the enclosure. The insulating blocks 150 and insulating covers 140 insulate each conductor from the other conductors of the conductor assembly 126 allowing the conductors 130 to be stacked on top of each other without having any interference between the phases. Thus, the insulation members 150 prevent phase-to-phase shorting when the conductors 130 are stacked on top of each other. It is envisioned that the conductor assembly 126 could have a different number of conductors 130 for distributing a different number of phases of electricity without departing from the scope of the disclosure.

Having described the invention in detail, it will be apparent that modifications and variations are possible without departing from the scope of the invention defined in the appended claims.

As various changes could be made in the above constructions and methods without departing from the scope of the invention, it is intended that all matter contained in the above description and shown in the accompanying drawings shall be interpreted as illustrative and not in a limiting sense.

What is claimed is:

1. An electrical conductor for use in a power distribution assembly comprising:
   a main conductor portion comprising electrically conductive material, the main conductor portion extending along an axis; and
   a plurality of flexible branch members comprising electrically conductive material, the flexible branch members extending laterally from the main conductor portion, each flexible branch member being selectively bendable and configured for electrical connection to an electrical switching apparatus;
   wherein the electrically conductive material of the main conductor portion and the plurality of flexible branch members comprises multiple layers of laminated conductive material, and wherein each branch member is selectively bendable such that the branch members can be bent in a first configuration to accommodate a first switching apparatus arrangement, and subsequently bent in a second or more configuration, different from the first configuration, to accommodate a second or more switching apparatus arrangements.

2. The conductor of claim 1, wherein at least a portion of the main conductor portion is flexible.

3. The conductor of claim 2, wherein an entirety of the main conductor portion is flexible.

4. The conductor of claim 1, further comprising insulation disposed around the main conductor portion and the plurality of flexible branch members.

5. The conductor of claim 4, wherein the insulation is disposed around only a portion of at least one of the flexible branch members such that a free end of the flexible branch member is exposed and free of insulation.

6. The conductor of claim 4, wherein the insulation is disposed around an entirety of at least one the flexible branch members.

7. The conductor of claim 1, wherein the main conductor portion is elongate and has a first side and a second side opposite the first side, a first flexible branch member extending laterally from the first side of the main conductor portion, and a second flexible branch member extending laterally from the second side of the main conductor portion.

8. The conductor of claim 7, wherein the first and second flexible branch members extend laterally from the main conductor portion at a common point along the axis of the main conductor portion.

9. The conductor of claim 1, wherein the main conductor portion and the plurality of flexible branch members are formed separately from each other and the flexible branch members are attached to the main conductor portion.

10. The conductor of claim 1, wherein each flexible branch member is selectively bendable by an end user.

11. The conductor of claim 1, wherein the main conductor portion comprises an elongate rigid central conductor portion.

12. A power distribution assembly comprising:
an enclosure; and
a flexible electrical conductor disposed in the enclosure, the flexible electrical conductor comprising a main conductor portion comprising electrically conductive material, and a plurality of branch members comprising electrically conductive material extending laterally from the main conductor portion, each branch member being selectively bendable and configured for electrical connection to an electrical switching apparatus;
wherein the electrically conductive material of the main conductor portion and the plurality of flexible branch members comprises multiple layers of laminated conductive material, and wherein each branch member is selectively bendable such that the branch members can be bent in a first configuration to accommodate a first switching apparatus arrangement, and subsequently bent in a second or more configuration, different from the first configuration, to accommodate a second or more switching apparatus arrangements.

13. The assembly of claim 12, further comprising a plurality of flexible electrical conductors disposed in the enclosure, the electrical conductors being insulated from each other.

14. The assembly of claim 13, wherein the assembly is configured to distribute multiple phases of electricity.

15. The assembly of claim 13, wherein the assembly is configured to accommodate multiple electrical switching apparatuses having different spacing between poles.

16. An electrical conductor assembly for use in a power distribution assembly comprising:
an electrical conductor; and
a casing covering at least a portion of the electrical conductor, the casing insulating said at least a portion of the electrical conductor;
wherein the electrical conductor comprises a flexible electrical conductor including a main conductor portion comprising electrically conductive material, and at least one flexible branch member comprising electrically conductive material extending laterally from the main conductor portion, the flexible branch member being selectively bendable and configured for electrical connection to an electrical switching apparatus;
wherein the electrically conductive material of the main conductor portion and the at least one flexible branch member comprises multiple layers of laminated conductive material, and wherein the branch member is selectively bendable such that the branch member can be bent in a first configuration to accommodate a first switching apparatus arrangement, and subsequently bent in a second or more configuration, different from the first configuration, to accommodate a second or more switching apparatus arrangements.

17. The conductor assembly of claim 16, wherein the casing includes a first passage for receiving the main conductor portion and a second passage for receiving the at least one branch member.

18. The conductor assembly of claim 16, further comprising insulation disposed around the at least one branch member, the casing being disposed around at least a portion of the insulation.

19. The conductor assembly of claim 16, wherein the casing comprises a plurality of casing members attached to each other.

20. The conductor assembly of claim 19, wherein the casing members have mating alignment structure to properly position the casing members relative to each other for attaching the casing members to each other.

* * * * *